(12) United States Patent
Mellerup et al.

(10) Patent No.: US 7,413,761 B2
(45) Date of Patent: Aug. 19, 2008

(54) METHOD FOR TREATING A SOLVENT-EXTRACTED PLANT RESIDUE WITH A FAT

(75) Inventors: Jens Mellerup, Tilst (DK); Claus Frost, Skodstrup (DK)

(73) Assignee: Aarhuskarlshamn Denmark A/S, Aarhus C (DK)

( * ) Notice: Subject to any disclaimer, the term of this patent is extended or adjusted under 35 U.S.C. 154(b) by 665 days.

(21) Appl. No.: 10/467,738

(22) PCT Filed: Feb. 22, 2002

(86) PCT No.: PCT/DK02/00118

§ 371 (c)(1),
(2), (4) Date: Jan. 14, 2004

(87) PCT Pub. No.: WO02/065857

PCT Pub. Date: Aug. 29, 2002

(65) Prior Publication Data

US 2004/0115333 A1    Jun. 17, 2004

(30) Foreign Application Priority Data

Feb. 23, 2001    (DK) ............................... 2001 00306

(51) Int. Cl.
*A23P 1/00* (2006.01)
(52) U.S. Cl. .................. 426/629; 426/601; 426/518; 426/520; 426/521; 426/630; 426/631; 426/632
(58) Field of Classification Search ................ 426/601, 426/615, 629–632, 518, 520, 521
See application file for complete search history.

(56) References Cited

U.S. PATENT DOCUMENTS

| | | | |
|---|---|---|---|
| 3,721,569 A | | 3/1973 | Steinkraus |
| 4,713,256 A | * | 12/1987 | Chaveron et al. ............ 426/631 |
| 4,746,529 A | * | 5/1988 | Rapp ........................... 426/660 |
| 5,252,349 A | * | 10/1993 | Carter, Jr. .................... 426/482 |
| 5,344,564 A | * | 9/1994 | Ohtsuka et al. ............. 210/634 |
| 5,919,502 A | | 7/1999 | Manez et al. |
| 5,932,277 A | * | 8/1999 | Dubberke ................... 426/631 |
| 6,015,913 A | * | 1/2000 | Kealey et al. ............... 549/386 |
| 6,066,350 A | * | 5/2000 | Purtle et al. ................. 426/430 |
| 6,221,422 B1 | * | 4/2001 | Kruger et al. ............... 426/631 |
| 6,238,724 B1 | * | 5/2001 | Carvallo et al. ............. 426/631 |
| 6,361,814 B2 | * | 3/2002 | Purtle et al. ................. 426/430 |
| 6,372,267 B1 | * | 4/2002 | Kealey et al. ............... 424/776 |
| 6,391,373 B1 | * | 5/2002 | Kaiser et al. ................ 426/631 |
| 6,610,343 B2 | * | 8/2003 | Purtle et al. ................. 426/430 |
| 6,673,379 B2 | * | 1/2004 | Kealey et al. ............... 424/776 |
| 6,737,088 B1 | * | 5/2004 | Kealey et al. ............... 424/776 |

FOREIGN PATENT DOCUMENTS

| | | | |
|---|---|---|---|
| DE | 1692387 | * | 2/1972 |
| DE | 1692387 | | 3/1972 |
| EP | 0 966 886 | | 4/1999 |
| GB | 573937 | | 12/1945 |
| WO | WO 98/34496 | | 2/1998 |

OTHER PUBLICATIONS

Jay, J. 1970. Modern Food Microbiology. D. Van Nostrand Co., New York, p. 36.*
Minifie, B. W. 1980. Chocolate, Cocoa and Confectionery: Science and Technology, $2^{nd}$ edition. AVI Publishing Company, INc., Westport, CT. p. 39-58, 67-69.*
Minifie, Bernard. 1980. Chocolate, Cocoa and Confectionery: Science and Technology. $2^{nd}$ edition. AVI Publishing Company, Westport, CP. p. 61, 62, 64, 76-77, 80, 81, 107-119, 123.*
Barrile, J. et al. 1970. The Manufacturing Confectioner, Sep. 1970, p. 34-37.*
"Bailey's Industrial Oil and Fat Products", Robert R. Allen et al. mentioned in specification on p. 2, lines 10-13, John Wiley & Sons, NY, 1982.
"Industrial Chocolate Manufacture and Use", S.T. Beckett mentioned in the specification on p. 2, line 25 and p. 3, line 6, $3^{rd}$ edition Blackwell Science, 1999.

* cited by examiner

*Primary Examiner*—Carolyn Paden
(74) *Attorney, Agent, or Firm*—Michael L. Dunn

(57) ABSTRACT

A method of treating solvent-extracted plant residue comprises (a) providing a plant residue of one or more plant parts with a reduced content of plant fats, the fats having been extracted by means of a solvent for said plant fats; (b) mixing said solvent-extracted plant residue with a conditioning fat; and (c) milling said mixture of plant residue and conditioning fat under reduced pressure, said conditioning fat being in a liquid state. If the milling step has taken place at a temperature below about 100° C., the resulting milled compound mixture is subjected to (d) a post heat treatment at temperatures above 100° C. A compound mixture of milled solvent-extracted plant residue and conditioning fat obtainable by the method. Food products and feeds comprising said compound mixture of milled solvent-extracted plant residue and conditioning fat.

36 Claims, No Drawings

METHOD FOR TREATING A SOLVENT-EXTRACTED PLANT RESIDUE WITH A FAT

1. BACKGROUND OF THE INVENTION

The present invention relates to a method of treating a solvent-extracted plant residue, a compound mixture of a milled solvent-extracted plant residue and conditioning fat obtainable by the method, and food products and feeds comprising the compound mixture.

The Technical Field

Generally, when producing vegetable oils and fats, the production process comprises a pressing step that produces a press cake as a by-product. The press cake comprises a plant residue with reduced fat content.

The press cake is often used as an animal feed. However, in the processing of cocoa for example, wherein a heating step (roasting) usually precedes the milling and pressing steps, the press cake can be broken and pulverized into a cocoa powder which is of a microbiological quality suited for human consumption.

Generally, in the production of vegetable oils and fats, solvent extraction can be used to increase the yield of recovered oils and fats. However, solvent extraction produces a solvent-extracted plant residue, often referred to as meal, which contains residual solvent and, usually, microbiological activity.

The meal is normally considered a waste product. In some cases, however, such as in production of soya oil from soya beans, the meal can be used in the production of animal feed.

In other cases, for example in production of shea butter, the solvent-extracted shea residue contains substances unsuitable for feed. Consequently, the meal has to be disposed of e.g. by combustion.

Some solvent-extracted plant residues have contents of functional constituents that can be used in human food. Examples include meal from cocoa beans containing aroma and color, and meal from flaxseed that is a source of phenolic acids and dietary fibres of which about a third is water-soluble mucilage.

Consequently, there is a need for a method for treating a solvent-extracted plant residue to provide a useful product having an acceptably low residual solvent content and low microbiological activity.

Prior Art Disclosures

"Bailey's Industrial Oil and Fat Products", Wiley Interscience Publication, Vol. 2, Fourth Edition, 1982, especially the section "Mechanical Expression of Oil and Solvent Extraction", Chapter 3, p. 201-245, discloses production of vegetable oils and fats in general.

Beckett, "Industrial Chocolate Manufacture and Use", Blackwell Science, Third Edition, 1999, especially the section "Cocoa Mass, Cocoa Butter and Cocoa Powder", Chapter 6, p. 101-114, discloses processing of cocoa.

DE examined patent application No. 1 692 387 discloses a method for production of cocoa-containing fat compound coating wherein crushed cocoa beans of natural humidity are pressed in an expeller press for removal of cocoa butter. The expelled residue is mixed with a non-cocoa fat and sugar in a one step liquid-milling process to produce a paste of chocolate grade powder. Nothing is mentioned neither about solvent extraction of residual cocoa butter of the expelled residue nor about any treatment of such solvent-extracted expelled residue.

U.S. Pat. No. 5,919,502 discloses a process for the production of a compound liquor which is suitable for making compound coatings and alternatives to chocolates; said process comprising feeding whole raw cocoa beans into an expeller to remove cocoa butter, and extracting residual cocoa butter by means of an organic solvent to produce a substantially fat-free cocoa cake. The cocoa cake is pulverized into cocoa powder and mixed with a confectionery fat to produce the compound liquor. Nothing is mentioned neither about mixing the substantially fat-free cocoa cake with the confectionery fat before pulverisation of the solvent-extracted cocoa cake into a fat containing cocoa powder, nor about wearing problems of milling equipment during milling of whole beans, or about any treatment to reduce the content of solvent in the compound liquor, or to provide a microbiological quality of food grade standard.

2. DISCLOSURE OF THE INVENTION

Object of the Invention

It is an object of the present invention to provide an improved method for treating solvent-extracted plant residues.

It is another object of the present invention to provide an improved method for such treatment whereby wearing of milling equipment by presence of soil particles and hard plant parts is reduced.

It is another object of the present invention to provide an improved method for such treatment whereby the amount of residual solvent is reduced to an acceptable level for application in foods.

It is another object of the present invention to provide an improved method for such treatment whereby the microbiological quality is improved to food grade standard.

Further objects appear from the description elsewhere.

Solution According to the Invention

According to the present invention, these objects are fulfilled by providing a method of treating a solvent-extracted plant residue as defined in claim 1, the method comprising (a) providing a plant residue of one or more plant parts with a reduced content of plant fats, the fats having been extracted by means of a solvent for said plant fats;

(b) mixing said solvent-extracted plant residue with a conditioning fat;

(c) milling said mixture of plant residue and conditioning fat under reduced pressure, said conditioning fat being in a liquid state; and (d) if the milling has taken place at a temperature below about 100° C., subjecting the resulting compound mixture of milled plant residue and conditioning fat to a post heat treatment at temperatures above about 100° C.

It has surprisingly turned out that by mixing said solvent-extracted plant residue with a conditioning fat and milling said mixture of plant residue and conditioning fat under reduced pressure, said conditioning fat being in a liquid state, the content of solvent in the plant residue is reduced.

Further, by milling said mixture of plant residue and conditioning fat, said conditioning fat being in a liquid state, the soil particles and hard plant parts are wetted thereby ensuring wet milling conditions that reduce wearing of milling equipment.

By conducting the milling step at a temperature above 100° C. or by subjecting the resulting compound mixture to a post heat treatment at such temperatures the content of solvent is further reduced and a microbial quality of food grade standard is provided.

3. DETAILED DESCRIPTION

Milling Conditions

Milling of the mixture of solvent-extracted plant residue and conditioning fat can be carried out by any suitable wet milling method known in the art.

Especially suited for the present method are retention mills that are known as one-step refiner/conch equipment in the art of chocolate production. An example is the Macintyre Refiner/Conch described in "Chocolate, Cocoa and Confectionery", 3.Ed., Chapman & Hall, 1989, p. 154.

The milling temperature at which said conditioning fat is present in a liquid state depends on the conditioning fat used.

High temperature favours the removal of the solvent and reduces the viscosity of the slurry. Too high temperatures, however, may result in undesirable decomposition of components in the meal e.g. flavour, carbohydrates and proteins. Too low temperatures, on the other hand, may result in undesirably long milling times before reducing the amount of residual solvent to an acceptable level.

In a preferred embodiment, the milling is carried out at a temperature in the range 40 to 160° C., preferably 40 to 130° C., most preferred 60 to 80° C.

Milling of the mixture of solvent-extracted plant residue and conditioning fat is carried out under reduced pressure whereby it is ensured that the solvent dissolved in the conditioning fat can be driven off from the said mixture. In a preferred embodiment, said milling is carried out under a pressure below 40 mbar whereby removal of solvent is increased.

Milling is carried out for a time period that is long enough to provide a desired grinding fineness of the plant residue. A desired grinding fineness of the milled plant residue can be measured in many ways known in the art.

In one aspect, the grinding fineness correlates to the maximum particle size and the particle size distribution that provides desired flow properties that are suited for subsequent processing and application.

In another aspect, the grinding fineness correlates to the maximum particle size that provides an efficient release of solvent from the plant parts to the conditioning fat and thereby ensures a sufficiently low amount of residual solvent left in the compound mixture.

In a preferred embodiment, the milled plant residue has a mean particle size below about 40 µm whereby the content of solvent is reduced. Typically, a maximum particle size of about 200 µm is obtained under these milling conditions.

The particle size and distribution of particle sizes obtained during a milling process can be determined in any suitable way that provides consistent measures reflecting the grinding fineness of the plant residue. Different methods may provide different results for the same plant residue.

For the preferred embodiments of an ongoing milling process, the micrometric measurement method has been used in the determination of grinding fineness.

The particle-size distribution is preferably determined by the analytical wet sieving method of USP 24, Method II.

Solvent

The solvents used to produce the solvent-extracted plant residue especially include those solvents that are permitted for the production of extracted food ingredients, e.g. methanol, ethanol, 2-propanol and hexane.

Generally, solvents can be in any suitable form e.g. in the form of pure solvent of a suitable grade with respect to the application of the solvent-extracted plant residue, or mixtures of solvents.

In a preferred embodiment, the solvent comprises hexane. According to Codex Alimentarius, Vol.1A, 1995 hexane is to be regarded as a food additive, and the use is justified by the objectives in section 3.2(d). Furthermore, hexane is in compliance with the "Carry-Over Principles". It may be present in a food as an additive if the additive is permitted and the amount does not exceed the maximum additive so permitted.

In Europe, hexane is permitted as a food additive. The permitted maximum amount of hexane is 10 mg/kg according to Directive 881344/EEC.

Plant Parts and Plant Residue

Plant parts from which plant residues of reduced plant fats are produced are known in the art.

Generally, they include plant parts used in processing of vegetable oils and fats that can be utilised in e.g. food industry. Typical plant parts are oil seeds, beans and nuts, e.g. rapeseeds, soybeans and shea nuts.

Generally, oil or fats are recovered by expression from the plant parts. Subsequently, solvent extraction of the pressed plant residue produces a solvent-extracted plant residue, e.g. the so-called meal, with a very low fat content. The processing is detailed in "Bailey's Industrial Oil and Fat Products", 1982.

In a preferred embodiment, said plant parts comprises oil seeds, husks, hulls, beans, nuts and shells.

Generally, the amount of fat content of the solvent-extracted plant residue may vary.

In a preferred embodiment, the meal has a fat content of less than 1% by weight obtained by the processing of whole seeds, beans and nuts comprising husks, hulls, shells, etc.

Preferred solvent-extracted plant residues are those containing functional constituents. Examples include meal from cocoa beans (*Theobroma cacao*) containing aroma and colour. Other examples include meal from flaxseeds (*Lineum usitatissimus*) that is a source of phenolic acids and dietary fibres of which one third is water-soluble mucilage.

Post Heat Treatment

For applications of the treated solvent-extracted plant residue as a food ingredient, it is desired and sometimes required by health authorities to reduce the amount of residual solvent even further, and also to ensure a microbiological quality of food grade standard.

We have found that both these objectives can be achieved by heating the treated solvent-extracted plant residue to a temperature above about 100° C.

Accordingly, if the milling has taken place at a temperature below about 100° C., the resulting compound mixture of milled plant residue and conditioning fat should be subjected to a post heat treatment at temperatures above about 100° C.

Particularly suitable conditions for post heat treatment can be obtained by proper selection of temperature, pressure, and post heat treatment time.

Accordingly, in a preferred embodiment, a sufficient temperature in said post heat treatment of the compound mixture is in the range of 100 to 160° C., preferably 110 to 140° C., most preferred 120 to 130° C.

In another preferred embodiment, said post heat treatment of the compound mixture is carried out below atmospheric pressure, preferably below 40 mbar.

In still another preferred embodiment, said post heat treatment of the compound mixture is carried out over a time period of 1 to 12 hours, preferably 2 to 8 hours, in particular about 4 hours.

Generally, the post heat treatment can be performed either immediately following the milling process, or it can be performed at a later time e.g. in a situation where storing is required and storing conditions do not ensure maintaining the microbiological quality of the treated product.

In a preferred embodiment, said post heat treatment of the compound mixture is carried out immediately after preparation thereof, e.g. in a continuous process.

Conditioning Fat

Generally, the conditioning fat is used as milling liquid that acts as a lubricant and carrier oil into which the solvent migrates from the solvent-extracted plant residue particles during milling.

Consequently, conditioning fat comprises fat that is able to bring the solvent-extracted plant residue into a condition where the residual solvent can migrate into the conditioning fat. This can be obtained for conditioning fat being in a liquid state providing proper dispersion of the solvent-extracted plant residue particles.

The conditioning fat is selected to have a melting point below the milling temperature.

The conditioning fat is further selected depending on the application.

In a preferred embodiment, said conditioning fat is a confectionery fat, or a vegetable fat.

The amount of conditioning fat depends mainly on the amount required for the solvent-extracted plant residue to disperse therein and for the solvent to migrate therein. A skilled person is able to adapt the amounts required for a particular application.

In a preferred embodiment, said conditioning fat is in an amount of at least 30% by weight, preferably 40 to 70% by weight.

The type of conditioning fat is selected according to the application of the final compound mixture of milled plant residue and fat.

Concerning fats and applications a general reference is made to: Michael Bockisch "Fats and Oils Handbook", AOCS Press, 1998, Chapter 6, Modification of Fats and Oils, p. 446-613 that details the processing and characteristics of fats and the alternatives to cocoa butter are especially referred to in section 6.2.3.5, p. 501-507.

In a preferred embodiment for the invention the following characteristics for the conditioning fat suited for the intended use are:

A. Confectionery Applications (i.e. Compounds, Moulds, Fillings and Coatings)

Suitable conditioning fats have a melting behaviour similar to that of cocoa butter (CBE, CBS) and the following typical values:

| Solid fat content according to IUPAC 2.150 | |
|---|---|
| at 20° C. | 65-97% |
| 25° C. | 55-95% |
| 30° C. | 35-63% |
| 35° C. | 0-15% |

Slip melting point 30-37° C.

B. Other Applications (i.e. Doughs, Cake Mixes, Cream Fillings, Spreads, Coatings and Extruded Cereals)

Suitable conditioning fats have a melting behaviour designed for the application in question and the following typical values:

| Solid fat content according to IUPAC 2.150: | |
|---|---|
| at 20° C. | 12-65% |
| 25° C. | 10-55% |
| 30° C. | 3-35% |
| 35° C. | 0-10% |
| 40° C. | 0-5% |

Slip melting point 25-40° C.

Plant

Plants suitable for the treatment according to the invention include any suitable oil-bearing plant from which its fats can be extracted by a suitable solvent.

In a preferred embodiment, said plant is a cocoa plant (*Theobroma cacao*) or other genus or species of the Byttneriacea family.

In a preferred embodiment, said plant parts comprise shells of cocoa beans.

In another preferred embodiment, said plant is a linseed (flax) plant (*Lineum usitatissimus*).

In a preferred embodiment, said plant parts comprise hulls of flaxseeds.

Apparatus

Generally, parts and units of equipment applicable to be used to carry out the method according to the present invention are known in the art, see Bailey (1982) and Beckett (1999).

Consequently, an apparatus for carrying out the method according to the present invention should comprise:

(a) a mixer adapted for mixing said solvent-extracted plant residue and a conditioning fat; and (b) a mill adapted to grind said mixture of solvent-extracted plant residue and conditioning fat from (a), and (c) heating means for providing said conditioning fat in a liquid state, the mixer and mill being adapted to operate under reduced pressure in an explosion-proof installation.

Preferably, the apparatus further comprises post treatment heating means for heating said mixture of milled plant residue and conditioning fat under reduced pressure to reduce the content of solvent to an acceptable level and provide a microbiological quality of substantial food grade standard.

The removed solvent can be disposed of in various ways.

Preferably, the apparatus further comprises regeneration means for the solvent, in particular hexane, whereby exhaust gases are returned to a regeneration unit and the solvent is regenerated.

The regenerated solvent is advantageously circulated to the solvent-extraction unit for producing solvent-extracted plant residue.

Compound Mixture of Milled Solvent-Extracted Plant Residue and Conditioning Fat

The product of the invention is a compound mixture of a milled solvent-extracted plant residue and conditioning fat obtainable by the treatment according to the method of the present invention.

Food Products

A compound mixture according to the present invention can be used in various applications in the food industry.

Generally, the resulting compound mixture of milled solvent extracted plant residue and conditioning fat can be used as an ingredient in fat containing food. The application area is dependent upon the plant material and the type of conditioning fat used.

Consequently, in another aspect of the present invention there is provided a food product comprising the compound mixture according to the invention.

In preferred embodiments, the compound mixture comprises a confectionery fat whereby confectionery food products are obtained.

In a preferred embodiment, the confectionery food product is in the form of a substitute for chocolate or as a substitute for a compound of cocoa powder and vegetable fat. For specific applications see Beckett (1999).

In another group of preferred embodiments, the compound mixture comprises a plastified fat whereby a variety of fat containing food products can be obtained.

In preferred embodiments, the compound mixture containing the plastified fat is an ingredient in a cake, a cream filling, a spread, or extruded cereals.

In a particularly preferred embodiment, the meal is originating from cocoa. Consequently, the food product comprises a compound mixture of milled solvent-extracted cocoa residue and conditioning fat that can be used to substitute cocoa powder and all or part of the fat in the food product.

In another preferred embodiment, the meal is originating from flaxseed. Consequently, the food product comprises a compound mixture of milled solvent-extracted flax residue and conditioning fat that can be used to substitute other fibre-containing ingredients e.g. graham flour and all or part of the fat in the food product.

In yet another aspect of the present invention there is provided a feed comprising the compound mixture according to the invention.

4. PREFERRED EMBODIMENTS

In the following, by way of examples only, the invention is further disclosed with a more detailed description of preferred embodiments.

Method of Treating Solvent-Extracted Plant Residue

The following illustrates the processing steps of an embodiment of the method according to the present invention following the prior art of vegetable oil processing to produce a solvent-extracted meal.

Vegetable oil processing (prior art):

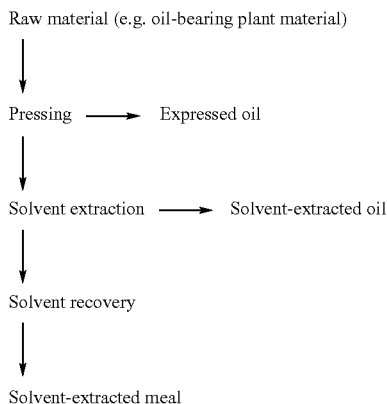

The solvent-extracted meal of the prior art comprises coarse-grained and hard plant residues including extraction solvent, microorganisms and particles of sand and other impurities.

Embodiment of the invention:

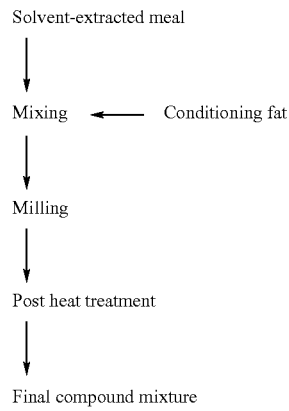

Apparatus for Treating Solvent-Extracted Plant R sidu

An apparatus suited for carrying out the method of the present invention comprises:

A mixer comprising a closed, stainless steel tank equipped with a stirrer. Further, the tank is preferably equipped with venting means for removing evaporated gasses, in particular the solvent, e.g. hexane.

A retention mill, preferably a one-step refiner/conch equipment, specifically a Macintyre Chocolate System, see "Chocolate, Cocoa and Confectionery", 3.Ed, Chapman & Hall, 1989, p. 154, which has been adapted to operate under reduced pressure, e.g. below 40 mbar, by connecting the inner drum of the mill to a vacuum pump.

Heating means for maintaining the conditioning fat in a liquid state, e.g. a jacket with hot water or steam, or an electric heating element.

An inlet means for adding of meal and conditioning fat, here preferably conditioning fat in liquid state, and output means for discharging the treated product.

All parts and units of the apparatus are installed explosion proof.

In a particularly preferred embodiment, the apparatus further comprises a heating means for post heat treatment of the mixture of milled plant residue and conditioning fat in a tank. Here the mixture of milled plant residue and conditioning fat is subjected to heat under reduced pressure, preferably below 40 mbar. The heating means preferably comprises a jacket with steam, or an electric heating element.

In a particularly preferred embodiment, the apparatus further comprises a solvent regenerator means for removing and collecting exhaust gasses, e.g. hexane, from the various units of the apparatus, and regenerating the solvent, e.g. hexane, in a regenerating unit.

The regenerated solvent is circulated to a solvent-extraction unit for producing solvent-extracted plant residue.

Determination of Particle Size and Particle-Size Distribution in a Milling Process The particle size and distribution of particle sizes obtained in the milling process can be determined in any suitable way that provides consistent measures reflecting the grinding fineness of the plant residue.

For the preferred embodiments of the milling process, the specific methods used are illustrated in the following.

In the present method, micrometric measurement of the largest particle of a mass of particles provides a rapid method of particle size determination for the determination of grinding fineness in an ongoing milling process.

The largest particle size is determined in a procedure comprising:

(a) in a mortar, or equivalent thereof, thoroughly mixing a small quantity of sample of the mass of particles with an equal amount of paraffin oil;

(b) providing an aliquot of this mixture between the plane-parallel surfaces of a micrometer calliper; and (c) measuring the distance between the anvil and the spindle of said calliper.

The procedure provides reproducible values of grinding fineness below about 40 μm.

The particle size distribution was determined by analytical wet sieving according to USP 24, Method II. Suitable test equipment for this method comprises the ultrasonic-sieve apparatus, type USG from Retch (Haan, Germany) wherein hexane was used as sieving liquid. The particle size determination was performed on a defatted sample that was provided by treating samples with hexane in a ratio 1:2 by weight at 50° C.

5. EXAMPLES

Embodiments of the invention are further illustrated by the following examples that are illustrative and should not be taken as limiting the scope of the present invention as defined in the claims.

Example 1

Reduction of the Hexane Content by Wet Milling of Cocoa Meal in a Confectionery Fat A mixture of 20 kg meal obtained as the hexane extracted residue from whole cocoa beans and 20 kg CEBES 30-08 was prepared at 60° C.

CEBES 30-08 (CEBES is a trade mark of Aarhus Oliefabrik A/S) is a confectionery fat of the CBS-type based on fractionated and hydrogenated palm kernel oil. It has the following specifications:

| Solid fat content according to IUPAC 2.150: | |
|---|---|
| at 20° C. | 94-97% |
| 25° C. | 87-91% |
| 30° C. | 40-48% |
| 35° C. | 0-5% |

Slip melting point according to AOCS Cc 3-25: 34° C.

The mixture of cocoa meal and CEBES 30-08 was transferred to a MACINTYRE Laboratory A1, Chocolate Refiner/Conch milling equipment (Macintyre Chocolate Systems, UK). The mixture was processed under reduced atmospheric pressure at 60° C. until the compound mixture had a grinding fineness below 40 μm, determined by micrometric measurements during the milling process. The individual measured values were in the range 25-34 μm.

The analytical results were: a hexane content of 1240 ppm in the mixture before milling and a hexane content of 110 ppm after milling.

Example 2

Post Heat Treatment for Reduction of the Hexane Content in a Compound Consisting of Milled Cocoa Meal and a Confectionery Fat Preliminary lab-scale experiments indicated that the hexane content in a compound consisting of milled cocoa meal in a vegetable fat could be reduced by a post heat treatment under vacuum at a temperature above 100° C. A temperature range of 120-130° C. was appropriate to reach a final hexane content of less than 10 ppm within 1 to 3 hours.

To verify the necessary processing time the following pilot-scale test was performed:

The compound mixture of Example 1 was transferred to a vessel equipped with a stirrer and heating jacket. At 64° C., a reference sample was taken. After applying vacuum (below 40 mbar), the vessel was heated to reach a constant temperature of 120° C. in the compound and a pressure of about 12 mbar.

At different time intervals samples were taken.

The hexane content in the samples was determined by GC headspace analysis.

The analytical results were as follows:

| | |
|---|---|
| Reference | after 0 min at 64° C. - 110 ppm hexane |
| Sample | after 90 min at 120° C. - 10 ppm - |
| Sample | after 150 min at 120° C. - 10 ppm - |

This example clearly demonstrates that by applying this embodiment of the invention, it is possible to reduce the hexane content of a compound mixture of a milled solvent-extracted plant residue and conditioning fat to acceptable levels.

Example 3

Milling and Post Heat Treatment of Cocoa Meal in a Confectionery Fat

The objective is to reduce the hexane content and extend the post heat treatment to include the improvement of the microbiological quality of the compound mixture to food grade standards. This is exemplified in the following pilot experiment.

1. Solvent-extracted Plant Residue

A meal of processed whole raw cocoa beans was used. The meal had a hexane content of 2 200 ppm, and the following particle size distribution:

| Particle size (mm) | Fraction % by weight | Accumulated % by weight |
|---|---|---|
| >1.00 | 14.4 | 14.4 |
| 0.50-1.00 | 24.4 | 38.8 |
| 0.40-0.50 | 10.6 | 49.4 |
| 0.13-0.40 | 40.3 | 89.7 |
| <0.13 | 10.3 | 100.0 |

2. Conditioning Fat

SILKAO 95-38 (SILKAO is a trade mark of Aarhus Olie) is a vegetable cocoa butter substitute (CBS) based on interesterified and hydrogenated lauric oil, and it has the following specifications:

| Solid fat content according to IUPAC 2.150 | |
|---|---|
| at 20° C. | 78-84% |
| 25° C. | 53-59% |
| 30° C. | 24-30% |
| 35° C. | 0-4% |

Slip melting point according to AOCS Cc 3-25: 34° C.

3. Procedure

A 1:1 mixture of meal and conditioning fat was prepared. Milling and post heat treatment were performed as described in Examples 1 and 2.

4. Results

The results are tabulated in the following.

| Parameter | Before milling | After milling | Post heat treatment for 1 hour | Post heat treatment for 4 hours |
|---|---|---|---|---|
| Water (%) | 6.1 | 2.5 | 0.17 | 0.1 |
| Hexane (ppm) | 1120 | 80 | 30 | 10 |
| Total plate count, 25° C. | 550 | 1400 | 180 | <10 |
| Total plate count, 30° C. | 1300 | 4700 | 350 | 20 |
| Yeast and moulds, PCU | 930 | 70 | <10 | <10 |
| Bacillus, PCU | 600 | 1400 | <100 | <100 |
| Bac. Cer., PCU | <100 | <100 | <100 | <100 |
| Clost. Sul., PCU | <10 | <10 | <10 | <10 |
| Anaerobic, PCU | 400 | 4000 | 800 | <100 |
| Aerobic, PCU | 200 | 5000 | 900 | <100 |

5. Conclusion

This example demonstrates that by extending the post heat treatment period at 120° C. it is possible to reduce the content of hexane and water as well as the microbial activity of a compound mixture according to the invention.

Example 4

Milling and Post Heat Treatment of Cocoa Meal in a Vegetable Fat

The pilot-scale experiment detailed in Example 3 was repeated with the use of a different conditioning fat.

VEGAO 73-02 (VEGAO is a trade mark of Aarhus Olie) was used as conditioning fat. The fat is a partially hydrogenated vegetable bakery shortening, and it has the following specifications:

| Solid fat content according to IUPAC 2.150: | |
|---|---|
| at 20° C. | 24% |
| 30° C. | 9% |
| 35° C. | 3% |

Slip melting point according to AOCS Cc 3-25: 36° C.

After milling and a post heat treatment for four hours at 120° C., the compound was plastified by a shortening process.

The apparatus used for the shortening process was a Pilot Perfector, Type 3-57 (Gerstenberg & Agger, DK) equipped with three chilling tubes, each fitted with an intermediate crystalliser followed by a pin rotor machine. The temperature sequence used was the following:

| Inlet | 50° C. |
|---|---|
| Chilling tubes | −15° C. |
| Outlet | +18° C. |

Due to the melting behaviour of the conditioning fat this final process is necessary for stabilising the mixture as it converts it from semi-liquid and inhomogeneous into a plastic and homogeneous paste.

This example demonstrates that a semi-liquid fat can be used as conditioning fat in the method of the invention.

Example 5

Milling and Post Heat Treatment of Flaxseed Meal in a Vegetable Fat

The pilot-scale experiment in Example 4 was repeated with the use of a meal obtained from solvent extracted flaxseed.

The processing parameters during milling and post heat treatment were as detailed in Example 3. No major differences were observed.

The results are tabulated in the following.

| Parameter | Before milling | After milling | Post heat treatment for 1 hour | Post heat treatment for 4 hours |
|---|---|---|---|---|
| Water (%) | — | 1.18 | 0.14 | 0.07 |
| Hexane (ppm) | 130 | 50 | 10 | 10 |
| Total plate count | — | 3000 | 30 | <10 |

Finally a shortening process as detailed in Example 4 plastified the compound.

This example demonstrates that the method of the invention is applicable to a meal originating from a plant different to cocoa.

Example 6

Use of a Cocoa Meal Compound in a Confectionery Product

The compound mixture from Example 3 was tested in the following recipe (in % by weight) for a dark type, chocolate-like, moulding compound:

| Cocoa meal compound (Ex. 3) | 30.0% |
|---|---|
| SILKAO 95-38 | 15.0% |
| Skim milk powder | 6.0% |
| Sugar | 48.6% |
| Lecithin | 0.4% |
| Flavour | q.s. |

The cocoa meal compound and SILKAO are melted and mixed with the rest of the ingredients. The mixture is refined on rollers followed by conching and moulded into bars without tempering.

A reference was prepared by substituting the 30% cocoa meal compound in the recipe with 15% cocoa powder and 15% SILKAO 95-38.

Concerning gloss, snap and melt down no significant difference between the two bars was observed.

This example demonstrates the use of a cocoa meal compound mixture according to the invention in a confectionery application.

Example 7

Use of a Cocoa Meal Compound in a Bakery Product

The compound mixture from Example 4 was tested in a Havana cake (chocolate cake) recipe as described in the following:

| Ingredients | Test cake, measures in g | Reference cake, measures in g |
|---|---|---|
| VEGAO 73-02 | 850 | 1000 |
| Cocoa meal compound, Ex. 4 | 300 | — |
| Sugar | 1000 | 1000 |
| Eggs | 850 | 850 |
| Wheat flour | 1350 | 1350 |
| Cocoa powder | — | 150 |
| Vanilla sugar | 50 | 50 |
| Raising agents (E500, E503) | 50 | 50 |
| Buttermilk | 750 | 750 |

The dough is prepared by mixing the fatty ingredient(s) with sugar at high speed to maximum volume. The eggs are added one by one.

The rest of the ingredients are added and medium-mixing speed maintained until the dough is ready for baking.

Baking is done at 190° C. for one hour.

After cooling the test cake is coated with the cocoa meal compound mixture according to the invention from Example 6. Likewise the reference cake is coated with the reference compound mixture from Example 6.

In an organoleptic panel test both cakes passed.

This example demonstrates the use of a compound mixture of milled solvent-extracted cocoa meal in vegetable fat according to the invention in a food product.

Example 8

Us of a Flax Meal Compound in a Bakery Product

Due to the high content of dietary fibres in the meal from flaxseed it can be used to fortify food.

The following recipe (in % by weight) exemplifies the use of the compound mixture from Example 5 as an ingredient in a biscuit of the digestive type:

| | |
|---|---|
| Flax meal compound (Ex. 5) | 30.0% |
| VEGAO 73-02 | 5.0% |
| Sugar | 12.0% |
| Wheat flour | 44.0% |
| Glucose syrup | 2.0% |
| Dried malt extract | 0.5% |
| Salt | 0.5% |
| Water | 6.0% |
| Flavour | q.s. |

The volume of the biscuit can be increased by the addition of a raising agent.

The ingredients are mixed on a planet mixer fitted with a dough hook. The biscuits are processed on a rotary moulder and baked at 200° C. for 12 min.

This example demonstrates the use of a compound mixture according to the invention based on a plant residue different from cocoa in a food product.

The invention claimed is:

1. A method of treating solvent-extracted plant residue, the method comprising
   (a) providing a plant residue of one or more plant parts with a reduced content of plant fats, the fats having been extracted by means of a solvent for said plant fats;
   (b) mixing said solvent-extracted plant residue with a conditioning fat;
   (c) milling said mixture of plant residue and conditioning fat under reduced pressure, said conditioning fat being in a liquid state; and
   (d) subjecting the resulting compound mixture of milled plant residue and conditioning fat to a post heat treatment at temperatures above about 100° C.

2. A method of treating solvent-extracted plant residue, the method comprising
   (a) providing a plant residue of one or more plant parts with a reduced content of plant fats, the fats having been extracted by means of a solvent for said plant fats;
   (b) mixing said solvent-extracted plant residue with a conditioning fat;
   (c) milling said mixture of plant residue and conditioning fat under reduced pressure, said conditioning fat being in a liquid state; and
   (d) subjecting the resulting compound mixture of milled plant residue and conditioning fat to a post heat treatment at temperatures above about 100° C.;
wherein said milling is carried out at a temperature in the range of about 40 to about 160° C.

3. The method according to claim 2 wherein said milling is carried out at a temperature in the range of about 40 to about 130° C.

4. The method according to claim 2 wherein said milling is carried out at a temperature in the range of about 60 to about 80° C.

5. The method according to claim 2 wherein said milling is carried out under a pressure below 40 mbar.

6. The method according to claim 5 wherein said milled plant residue has a mean particle size below about 40 μm.

7. The method according to claim 5 wherein said solvent comprises hexane.

8. The method according to claim 5 wherein said conditioning fat is in an amount of at least 30% by weight of the compound mixture.

9. A compound mixture comprising a milled solvent-extracted plant residue and conditioning fat obtainable by the treatment according to the method as defined in claim 5.

10. A food product comprising the compound mixture of claim 9 wherein the compound mixture comprises a confectionery fat.

11. The food product according to claim 10 in the form of a substitute for chocolate or for a compound of cocoa powder and vegetable fat.

12. The food product according to claim 10 comprising a compound mixture of milled solvent-extracted cocoa residue and conditioning fat.

13. The food product according to claim 10 comprising a compound mixture of milled solvent-extracted flax residue and conditioning fat.

14. The method according to claim 2 wherein said milled plant residue has a mean particle size below about 40 μm.

15. The method according to claim 2 wherein said solvent comprises hexane.

16. The method according to claim 2 wherein said plant parts are selected from the group consisting of oil seeds, husks, hulls, beans, nuts, shells and mixtures thereof.

17. The method according to claim 2 wherein said post heat treatment of said compound mixture of milled plant residue and conditioning fat is in the range of about 100 to about 160° C.

18. The method according to claim 17 wherein said post heat treatment is carried out under vacuum.

19. The method according to claim 17 wherein said post heat treatment is carried out over a time period of about 1 to about 12 hours.

20. The method according to claim 17 wherein said post heat treatment is carried out immediately after the milling step (c).

21. The method according to claim 18 wherein said post heat treatment is carried out immediately after the milling step (c).

22. The method according to claim 2 wherein said post heat treatment of said compound mixture of milled plant residue and conditioning fat is in the range of about 110 to about 140° C.

23. The method according to claim 22 wherein said post heat treatment is carried out under vacuum.

24. The method according to claim 22 wherein said post heat treatment is carried out over a time period of about 2 to about 8 hours.

25. The method according to claim 2 wherein said conditioning fat is a confectionery fat or a vegetable fat.

26. The method according to claim 2 wherein said conditioning fat is in an amount of at least 30% by weight of the compound mixture.

27. The method according to claim 2 wherein said plant is a plant of the Byttneriacea family.

28. The method according to claim 27 wherein said plant parts comprise shells of cocoa beans.

29. The method according to claim 2 wherein said plant is a linseed (flax) plant (Lineum usitatissimus).

30. The method according to claim 29 wherein said plant parts comprise hulls of flax seeds.

31. A compound mixture comprising a milled solvent-extracted plant residue and conditioning fat obtainable by the treatment according to the method as defined in claim 2.

32. A food product comprising the compound mixture of claim 31.

33. The food product according to claim 32 wherein the compound mixture comprises a plastified fat.

34. A feed comprising the compound mixture defined in claim 31.

35. A compound mixture according to claim 31 wherein the amount of conditioning fat is at least 30% by weight of the compound mixture.

36. The method of claim 2 where the post heat treatment of the compound mixture of milled plant residue and conditioning fat is in the range of 120-130° C.

* * * * *